United States Patent
Perol

(10) Patent No.: US 7,768,244 B2
(45) Date of Patent: Aug. 3, 2010

(54) POWER-MAXIMIZING ELECTRICAL ENERGY GENERATION SYSTEM

(75) Inventor: Philippe Alfred Perol, Leiden (NL)

(73) Assignee: Agence Spatiale Europeene, Paris (FR)

( * ) Notice: Subject to any disclaimer, the term of this patent is extended or adjusted under 35 U.S.C. 154(b) by 370 days.

(21) Appl. No.: 12/000,777

(22) Filed: Dec. 17, 2007

(65) Prior Publication Data

US 2008/0247201 A1 Oct. 9, 2008

(30) Foreign Application Priority Data

Dec. 18, 2006 (FR) .................................. 06 11007

(51) Int. Cl.
G05F 1/10 (2006.01)
(52) U.S. Cl. .................. 323/234; 323/906; 320/39; 320/101
(58) Field of Classification Search .......... 323/222, 323/224, 234, 282–288, 272, 268, 906, 909; 320/39, 101, 150, 138, 117, 102, 149; 307/34, 307/43, 64–66, 46
See application file for complete search history.

(56) References Cited

U.S. PATENT DOCUMENTS

| 4,794,272 | A | 12/1988 | Bavaro et al. | |
|---|---|---|---|---|
| 6,316,925 | B1 | 11/2001 | Canter | |
| 6,369,462 | B1* | 4/2002 | Siri | 307/51 |
| 6,438,005 | B1* | 8/2002 | Walter | 363/60 |
| 6,583,610 | B2* | 6/2003 | Groom et al. | 323/288 |
| 7,564,149 | B2* | 7/2009 | Siri et al. | 307/80 |
| 7,646,116 | B2* | 1/2010 | Batarseh et al. | 307/82 |

FOREIGN PATENT DOCUMENTS

| FR | 2 785 103 | 4/2000 |
|---|---|---|
| FR | 2 885 237 | 11/2006 |

OTHER PUBLICATIONS

G. De Cesare et al., "Maximum power point tracker for portable photovoltaic systems with resistive-like load", Solar Energy, vol. 80, No. 8, 2006, pp. 982-988.
P. Huynh et al., "Design and Analysis of a Regulated Peak-Power Tracking System", IEEE Transactions on Aerospace and Electronic Systems, vol. 35, No. 1, Jan. 1999, pp. 84-92.
H. Jensen et al., "Power Conditioning Unit for Rosetta / Mars Express", Proceedings of the Sixth European Space Power Conference, 2002.
W. Denzinger, "Electrical Power Subsystem of Globalstar", Fourth European Space Power Conference, 1995.
D. O'Sullivan et al., "The Sequential Switching Shunt Regulator $S^3R$", Proceedings of the Third ESTEC Spacecraft Power Conditioning Seminar, Noordwijk, The Netherlands, Sep. 21-23, 1977, ESA SP-126, pp. 123-131).

* cited by examiner

*Primary Examiner*—Rajnikant B Patel
(74) *Attorney, Agent, or Firm*—Clark & Brody

(57) ABSTRACT

An electrical energy generation system comprising:
  a plurality of photovoltaic generators connected in parallel and connected to a common load via respective DC voltage converters; and
  a regulator configured to vary the transconductances of said respective voltage converters to maximize the power generated by said current generators;
wherein:
  said generators are also connected to a common input of an additional voltage converter the output of which is connected to said common load; and
  said regulator is also configured to vary the transconductance of said additional voltage converter to maximize the power generated by said current generators.

21 Claims, 3 Drawing Sheets

POWER-MAXIMIZING ELECTRICAL ENERGY GENERATION SYSTEM

The invention relates to an electrical energy generation system comprising direct current generators connected in parallel and connected to a common load via respective DC voltage converters, said system further comprising a regulator for varying the transconductances of said voltage converters to maximize the power generated by said current generators.

The invention applies in particular, although this is not limiting on the invention, to photovoltaic solar generators, and more particularly to solar generators of spacecraft.

BACKGROUND OF THE INVENTION

Satellites and space probes generally include photovoltaic generators intended to supply power to the onboard equipments and to charge the batteries that supply power during eclipses.

Electrical energy generation systems for space applications are conventionally designed so that the photovoltaic generators operate at a predetermined point on their voltage-current characteristics. This solution has the advantage of simplicity, but cannot maximize the power generated. In fact, it is known that photovoltaic generators have an optimum operating point, known as the maximum power point MPP= $(V_{MPP}, I_{MPP})$, that is highly dependent on the temperature and the illumination of said generators and varies over time as they age.

For this reason, it is known to connect photovoltaic generators to their load (a power distribution busbar or an energy storage device such as a battery) via DC voltage converters presenting transconductance that can be varied automatically in order to "track" the optimum operating point (this is known as maximum power point tracking (MPPT)).

That technique is increasingly used in space applications.

For example, the Rosetta probe of the European Space Agency (ESA) is intended to operate in widely varying conditions of illumination and temperature (reduction of illumination by a factor of 25 accompanied by a temperature drop of 360° C. during the mission), making it necessary to use a MPPT controller. The Rosetta power system has been used again for two other ESA missions, Mars Express and Venus Express.

It is generally very important for an electrical energy generation system for space applications to have a modular structure, with good segregation between modules. Here "segregation" refers to the fact that failure of one element must not propagate to others. More generally, good fault tolerance is looked for; for example, it is desirable for an isolated fault in a power control device (switch, regulator, converter, etc.) not to cause any loss of power.

Prior art MPPT (maximum power point tracking) electrical energy generation systems do not have satisfactory segregation and fault tolerance properties. Moreover, it is difficult in such systems to verify reliably that each module is operating correctly after it has been integrated.

For example, in the system used in the Rosetta, Mars Express, and Venus Express probes, segregation between the individual photovoltaic generators constituting the solar panels was sacrificed in the search for very high energy efficiency.

The document FR 2 885 237 describes an MPPT electrical energy generation system that segregates the individual generators and it is envisaged to use them in the Bepi-Colombo probe. However, the fault tolerance of that system is not entirely satisfactory because an isolated fault can cause the loss of an entire section of a solar panel.

In contrast, the power regulators commonly used by the European space industry achieve very good segregation of the generator modules and entirely satisfactory resistance to isolated faults. Those power control systems are essentially the sequential switching shunt regulator ($S^3R$) described in the paper "The Sequential Switching Shunt Regulator $S^3R$" by D. O'Sullivan and A. Weinberg, Proceedings of the Third ESTEC Spacecraft Power Conditioning Seminar, Noordwijk, Netherlands, 21-23 Sep. 1977, and the sequential switching switchover shunt regulator ($S^4R$) described in the document FR 2 785 103.

However, those regulators do not implement photovoltaic generator maximum power point tracking.

OBJECTS AND SUMMARY OF THE INVENTION

An object of the invention is therefore to provide an electrical energy generation system comprising a plurality of individual generators enabling maximum power point tracking of said generators combined with satisfactory fault tolerance and/or good segregation between said individual generators.

Another object of the invention is to provide an electrical energy generation system of this kind that also has good energy efficiency and/or a simple modular structure.

A further object of the invention is to provide this kind of system enabling modular integration and verification and easy detection of assembly errors.

According to the invention, at least one of the above objects is achieved by an electrical energy generation system comprising a plurality of direct current generators connected in parallel and connected to a common load via respective DC voltage converters having variable transconductance and a regulator configured to vary the transconductance of said voltage converters to maximize the power generated by said current generators;

wherein said generators are also connected to a common input of an additional DC voltage converter having its output connected to said common load, said additional DC voltage converter also having variable transconductance and said regulator is also configured to vary the transconductance of said additional voltage converter to maximize the power generated by said current generators.

According to advantageous embodiments of the invention:

The DC current generators may be connected to said common load and to the common input of said additional DC voltage converter via respective first and second unidirectional devices for isolating said generators from one another.

Said common load may be a capacitive load.

Said common load may be either a power distribution busbar or an energy storage device.

A capacitive element may shunt the common input of said additional DC voltage converter.

Said direct current generators may have substantially identical operating characteristics and said regulator may impose the same transconductance on said respective voltage converters and said additional voltage converter.

Said regulator may be adapted to control the transconductances of said respective DC voltage converters and said additional DC voltage converter.

Said regulator may be adapted to vary the transconductances of said respective voltage converters and said additional voltage converter as a function of a voltage sampled at said common input of said additional voltage converter.

Said regulator may be adapted to vary the transconductances of said respective voltage converters and said additional voltage converter to impose continuous oscillation of the operating points of said direct current generators around their maximum power point.

Said regulator may instead be adapted to vary the transconductances of said respective voltage converters and said additional DC voltage converter to impose a predefined voltage at the terminals of said direct current generators determined as a function of an external condition affecting the operation of said generators.

Said respective voltage converters and said additional voltage converter may be adapted to behave as open circuits in the event of a single fault.

Said direct current generators may be photovoltaic generators.

The regulator may be configured to vary the transconductance of said voltage converters and said additional DC voltage converter so as to operate said direct current generators in a predefined region of their voltage-current characteristic in which the electrical power supplied by said generators is not the maximum power, if that electrical power is sufficient to power said common load and to maximize the power generated by said current generators otherwise.

According to a first variant of the invention, said common load is a power distribution busbar, preferably voltage-regulated, and said direct current generators are also connected to an energy storage device via a charging regulator shunting said additional voltage converter.

Said energy storage device may then advantageously be connected to the inputs of said voltage converters, which are adapted to operate as discharge regulators to supply power to said common load from said energy storage device. Said energy storage device may advantageously be connected to the inputs of said respective voltage converters via a third unidirectional device for preventing current flowing from said inputs to said energy storage device.

Under normal operating conditions, the voltage at the terminals of said energy storage device is then preferably lower than that at the terminals of said direct current generators and higher than that at the terminals of said common load.

According to a second variant of the invention, said common load is an energy storage device connected to supply power to a main power distribution busbar; a secondary power distribution busbar is connected to said common input of the additional DC voltage converter via a voltage regulator; and the input of said input voltage regulator is also connected to said energy storage device via a unidirectional device preventing current flowing from said secondary power distribution busbar to said energy storage device.

The system may advantageously also include a unidirectional device disposed to prevent current flowing from said secondary power distribution busbar to said voltage regulator.

The main power distribution busbar may in particular be connected to supply power to impulsive loads.

BRIEF DESCRIPTION OF THE DRAWINGS

Other features, details and advantages of the invention emerge on reading the description given with reference to the appended drawings, which are provided by way of example, and in which.

MORE DETAILED DESCRIPTION

Figure 1:
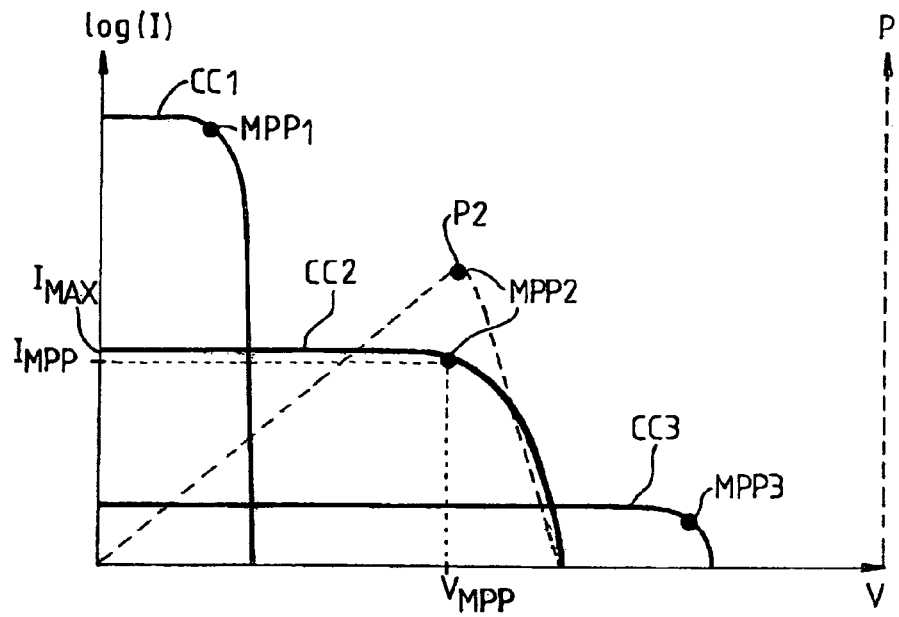
FIG. 1 illustrates the photovoltaic generator maximum power point tracking principle.

FIG. 1 shows to a semi-logarithmic scale-three characteristic voltage/current curves CC1, CC2, CC3 of a photovoltaic generator for decreasing levels of illumination. The three characteristic curves have a first portion in which the current I is practically independent of the voltage V at the terminals of the generator, a second portion in which the voltage V is practically independent of the current I, and an "elbow" linking these two portions. Clearly, for the three characteristic curves, the maximum power points MPP1, MPP2, and MPP3 are situated in corresponding relationship to said elbow. The dashed line curve P2 shows the dependence of the power P=IV on the voltage V for the intermediate level of illumination.

For a photovoltaic generator to operate at its maximum power point, it must be connected to a load having an appropriate impedance. Clearly, from FIG. 1, a load optimizing the power generated under intermediate illumination conditions (curve CC2) would become totally unsuitable in the event of a greatly increased level of illumination (CC1) or a greatly decreased level of illumination (CC3). Added to this is the dependence of the characteristic curves on the temperature of the generators and their variation over time because of ageing of the generators.

The maximum power point tracking (MPPT) technique varies the load impedance of a photovoltaic generator to operate it at its maximum power point. This is achieved by connecting said generator to the input of a voltage converter having a variable transconductance, the output of said converter being connected to the load to be supplied with power (power distribution busbar or battery).

Systems implementing this technique are described in the papers "Electrical Power Subsystem of Globalstar", W Denziger, Fourth European Space Power Conference 1995, and "Power Conditioning Unit for Rosetta/Mars Express", H Jensen and J Laursen, Proceedings of the Sixth European Space Power Conference 2002, and in the documents U.S. Pat. Nos. 4,794,272 6,316,925 and FR 2,885,237, for example.

Figure 2:
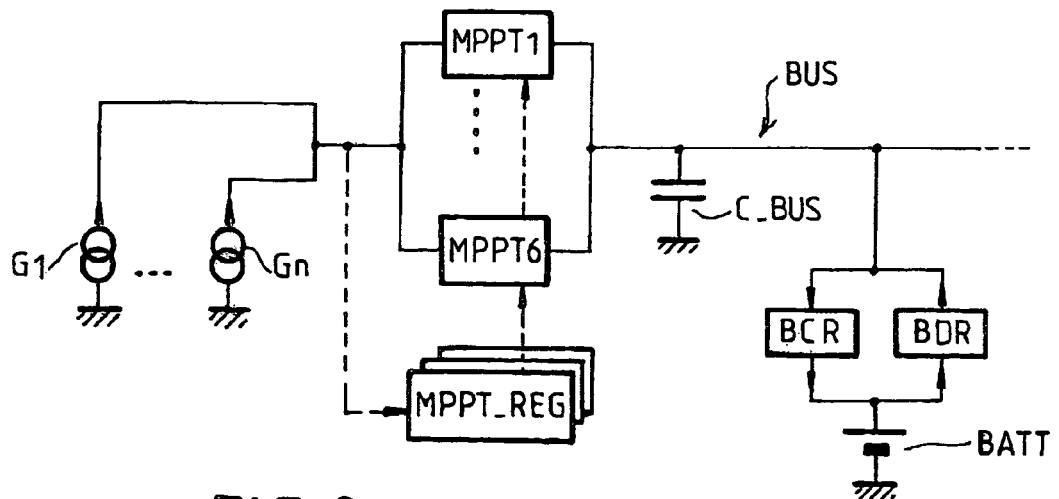
FIG. 2 is a theoretical circuit diagram of the topology of the prior art electrical energy generation system of the Rosetta probe.

FIG. 2 is a simplified diagram of the modular electrical energy generation system developed for the Rosetta probe in which segregation between modules has been sacrificed to optimize energy efficiency.

This system comprises a plurality of individual photovoltaic generators G1-Gn connected in parallel. The outputs of these generators are connected to a common input EC of a set of six DC voltage converters MPPT1-MPPT6 connected in parallel and controlled by a common regulator MPPT_REG in order to track the maximum power point of the generators. The converters MPPT1-MPPT6 are rated so that in the event of failure of one of them the remaining five can generate the full power of the system; as the voltage (34-80 V) corresponding to the maximum power point of the photovoltaic generators is higher than the voltage (28 V) of the power supply distribution busbar of the system, these are step-down converters, also known as Buck converters. The regulator MPPT_REG features majority vote redundancy, so as to supply a reliable regulation signal to said converters. The outputs of the converters are connected to a regulated voltage power distribution busbar BUS operating at 28 V and having a capacitance C_BUS. The regulated voltage power distribution busbar BUS is also connected to a battery BATT via a battery charging regulator BCR and a battery discharging regulator BDR.

Inspection of FIG. 2 shows that a short-circuit occurring in one of the generators G1-Gn is sufficient to short-circuit all the generators. Likewise, a short-circuit occurring in one of the converters MPPT1-MPPT6 is liable to short-circuit the power distribution busbar BUS. Protection diodes could certainly be provided downstream of the generators G1-Gn and the converters MPPT1-MPPT6, but this would degrade energy efficiency. In any event, adding protection diodes to a system of this type would not resolve the other main drawback of this architecture, namely the difficulty of reliable modular verification of correct operation of each element.

Figure 3:
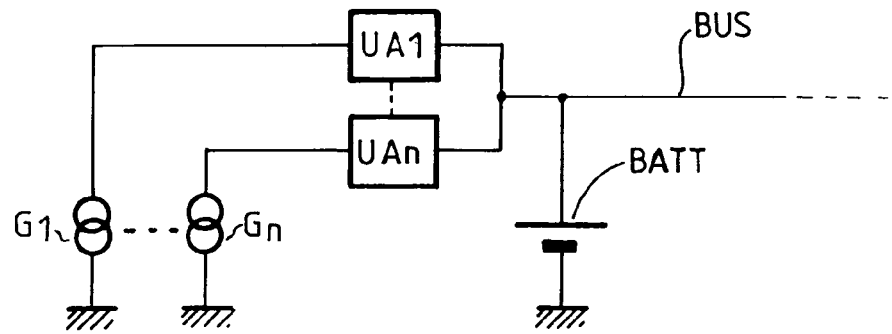
FIG. 3 is a theoretical circuit diagram of the prior art electrical energy generation system of the Bepi-Colombo probe.

In the electrical energy generation system described in the document FR 2,885,237, represented in FIG. 3, the power distribution busbar BUS is supplied with power by photovoltaic generators G1-Gn. Each generator is connected in series with a respective adaptation unit UA1-UAn comprising a voltage converter and an associated regulator for tracking the maximum power point of the generator. In this kind of system, the various sections can be segregated by providing a unidirectional device (diode) at the input and output of each adaptation unit, at the cost of reduced energy efficiency because of the dissipation of power in said unidirectional devices. However, a fault occurring in an adaptation unit would cause the loss of the power supplied by the corresponding generator, which may not be acceptable, in particular for missions that leave the solar system.

Using individual MPPT regulators for each generator, which significantly increases the complexity of the system, may prove necessary under particular conditions, especially if large differences of temperature or level of illumination between the individual photovoltaic generators are predicted.

Thus it can be seen that no electrical generation system with maximum power point tracking has an entirely satisfactory level of fault tolerance combined with good energy efficiency and a modular and relatively simple structure.

Figure 4:
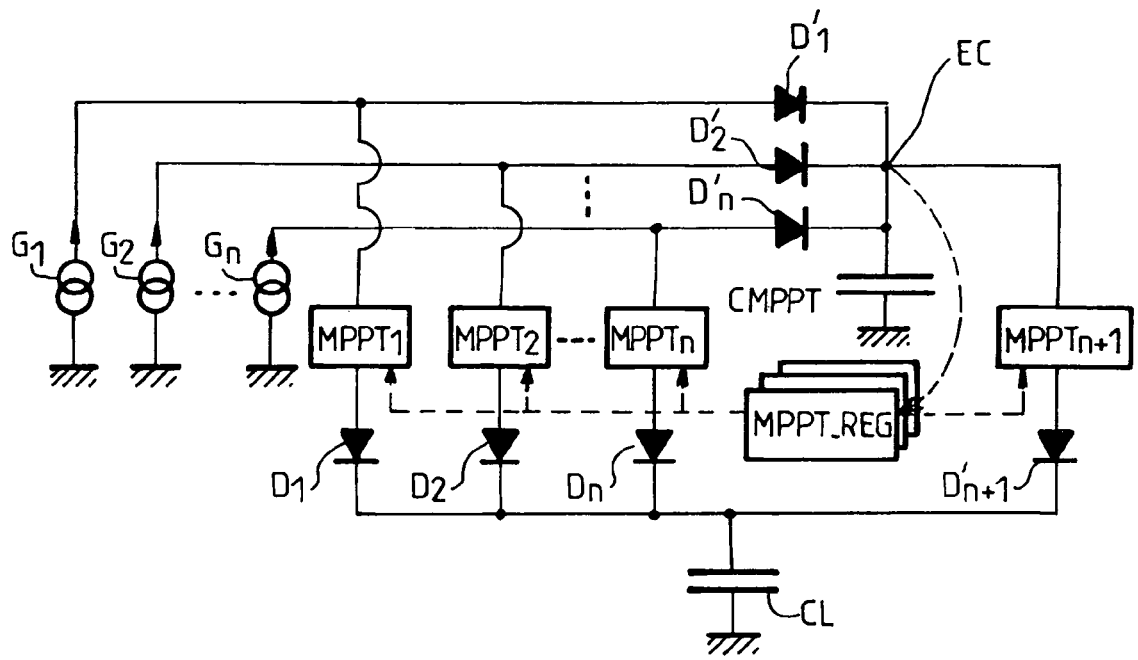
FIG. 4 is a theoretical circuit diagram of the topology of a first embodiment of an electrical energy generation system of the invention.

The topology of a first embodiment of an electrical energy system of the invention is represented in FIG. 4.

This system comprises direct current generators G1, G2-Gn, generally photovoltaic generators, connected in parallel and connected to a common load CL via respective voltage converters MPPT1-MPPTn. The common load CL, represented in the figure by a capacitor, can be a regulated or unregulated power distribution busbar or an energy storage device such as a battery.

The converters can be of the step-down (buck) or step-up type, as a function of the specific application. Their transconductance can be varied by a regulator MPPT_REG in order to operate the generators G1, G2-Gn at their maximum power point. There is one regulator MPPT_REG for all the n voltage converters, as in the Rosetta system. It features majority vote redundancy to provide a reliable regulation signal.

The maximum power point tracking technique used by the regulator MPPT_REG can advantageously be based on the "perturbation and observation" principle described in the aforementioned paper "Power Conditioning Unit for Rosetta/Mars Express", by H Jensen and J. Laursen. However, other prior art techniques can also be applied, for example that described in the aforementioned document FR 2 885 237. Another technique, which is particularly simple to implement, controls the voltage converters MPPT1-MPPTn to slave the voltage at the terminals of the generators G1-Gn to predefined optimum values stored in a memory, said optimum values corresponding to different levels of illumination and different temperatures. These predefined values can also take account of the effects of ageing of the photovoltaic cells and any other external conditions affecting the operation of said generators.

The outputs of the converters MPPT1-MPPTn are connected to the common load CL via first unidirectional isolating devices (typically diodes) D1, D2-Dn in order to prevent a short circuit in one of them short circuiting said load CL. In any event, for reasons that are made clear below, it is preferable for the converters MPPT1-MPPTn to be designed so that an isolated fault places them in an open circuit condition in which no current flows through them.

The generators G1-Gn are also connected via second unidirectional isolating devices (typically diodes) D'1, D'2-D'n to a common input EC of an additional DC voltage converter MPPTn+1 the output of which is in turn connected to said common load CL via another diode D'n+1.

The additional voltage converter MPPTn+1 is of the same type as the converters MPPT1-MPPTn and its transconductance is regulated by the regulator MPPT_REG.

A capacitor CMPPT shunts the common input EC of said additional DC voltage converter MPPTn+1. The voltage at the point EC relative to ground, and thus the voltage at the terminals of CMPPT, is used by the regulator MPPT_REG to determine the transconductance of the converters MPPT1-MPPTn+1. The capacitance of the capacitor CMPPT depends on the operation of the regulator MPPT_REG; for example, with a regulator of the type used in the Rosetta and Globalstar probes, the capacitance of the capacitor CMMPT must predominate over the stray capacitance of each individual solar generator, and therefore have a value of a few microfarads (µF).

Under normal operating conditions, the current supplied by the generators G1-Gn is divided uniformly between the n+1 voltage converters MPPT1-MPPTn and MPPTn+1. Consequently the second unidirectional isolating devices D'1-D'n have only a small fraction ($1/(n+1)$) of that current flow through them and their presence therefore does not significantly degrade the energy efficiency of the system. It is nevertheless important that said unidirectional devices remain in the conducting state so that the voltage at the point EC coincides with the voltage at the terminals of the generators G1-Gn (ignoring the small voltage drop across D'1-D'n).

Clearly, by means of the unidirectional devices D1-Dn and D'1-D'n, the various sections of the system are isolated from one another in the sense that failure of one of them cannot propagate to the others.

Moreover, and in contrast to what happens in the system described in the document FR 2 885 237, the failure of a voltage converter MPPT1-MPPTn does not lead to loss of the power supplied by the corresponding generator G1-Gn. In fact, as mentioned above, the converters MPPT1-MPPTn behave as open circuits in the event of a single fault. Now, if one of these converters goes to an open circuit state, the current supplied by the corresponding generator simply flows through the additional converter MPPTn+1, which is also controlled to ensure operation of said generator at the maximum power point.

The system is therefore resistant to isolated faults occurring in the power regulation electronics.

The FIG. 4 system can be used to supply power to a regulated or unregulated voltage power distribution busbar. However, the FIG. 5 embodiment of the invention is more suitable for a regulated voltage power distribution busbar.

In this embodiment of the invention, the common load supplied with power via the voltage converters MPPT1-MPPTn is a regulated voltage power distribution busbar BUS, represented in the figure by a capacitor. The system further comprises an energy storage device (typically a battery) BATT connected to the generators G1-Gn via a battery charging regulator BCR connected to the point EC and shunting the additional voltage converter MPPTn+1. The battery charging regulator BCR is redundant and includes a unidirectional isolating device D" to protect the battery BATT against possible short-circuits.

The battery BATT is in turn connected, again via third unidirectional isolating devices (diodes) D'''1-D1'''n, to the inputs of the voltage converters MPPT1-MPPTn, to be able to supply power to the power distribution busbar via them, controlled so as to behave like conventional discharging regulators, if the power supplied by the generators G1-Gn is insufficient. This avoids having to provide separate discharging regulators.

The n unidirectional isolating devices D'''1-D1'''n could also be replaced by a single unidirectional device disposed between the battery BATT and the input connections of the voltage converters MPPT1-MPPTn. This solution is less advantageous, however, as it would require a high-power diode, which would cause high losses and would suffer from localized dissipation problems.

Figure 5:
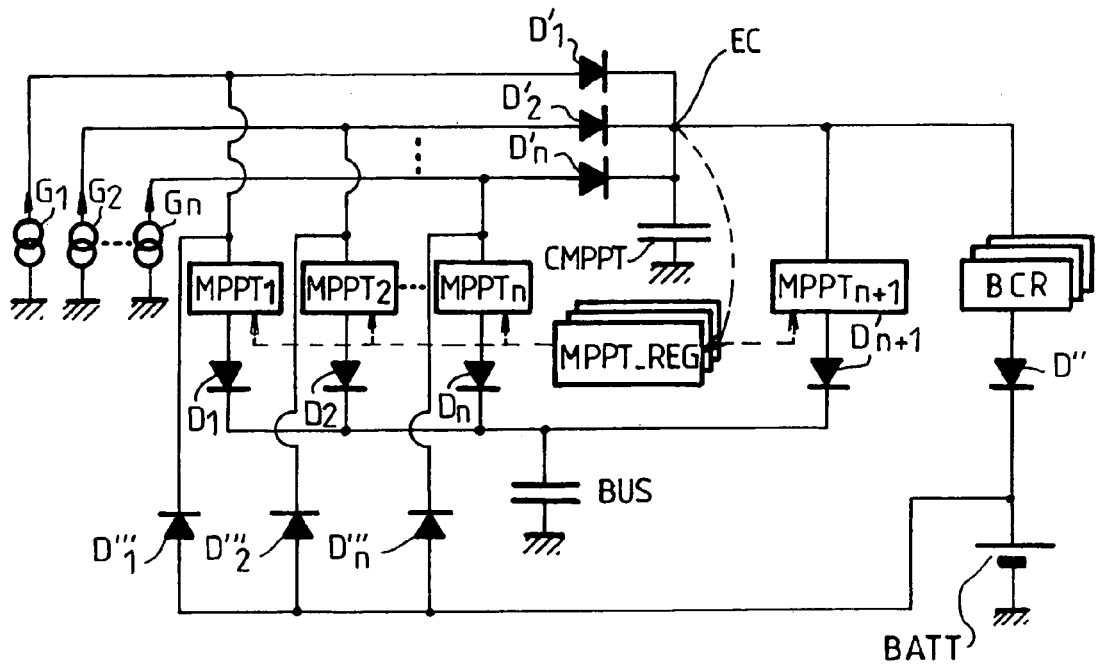
FIG. 5 is a theoretical circuit diagram of the topology of a second embodiment of an electrical energy generation system of the invention.

The operation of a photovoltaic power generation system according to FIG. 5 during a transition from an eclipse to full sunlight is described below. To this end, it is assumed that the voltage at the terminals of the battery BATT is lower than that at the terminals of the generators G1-Gn and higher than the voltage on the power distribution busbar BUS. For example, a voltage on the power distribution busbar BUS fixed at 28 V, a battery voltage from 30 to 40 V and generators G1-Gn whose maximum power point corresponds to a voltage from 40 to 80 V may be considered. In fact, what is most important is that the voltage at the end of charging the battery is always lower than the voltage $V_{MPP}$ of the generators G1-Gn at the maximum power point.

During an eclipse, the photovoltaic generators G1-GN do not supply current and the power distribution busbar BUS is fed with power entirely by the battery BATT via the voltage converters MPPT1-MPPTn, which are controlled by the regulator MPPT_REG to behave like discharging regulators; the voltage at the point EC is substantially equal to the charging voltage of the battery BATT. In the event of failure of one of these voltage converters, the corresponding fraction of the current supplied by the battery flows through the additional converter MPPTn+1.

When the sun emerges, the photovoltaic generators G1-Gn begin to supply current, which is added to the current from the battery. However, the voltage at the point EC remains equal to that of the battery BATT, and said generators therefore do not operate at the maximum power point.

On emerging from the eclipse, it is necessary to decouple the battery BATT from the power distribution busbar BUS and to activate photovoltaic generator maximum power point tracking. To this end, it is possible to interrupt the current drain via the voltage converters MPPT1-MPPTn for a very short time, typically of the order of a few tens of microseconds: under these conditions, the current supplied by the generators is used entirely to charge the capacitor CMPPT; the voltage at the point EC increases above the voltage of the battery BATT and reverse biases the diodes D'''1-D1'''n. When the voltage converters MPPT1-MPPTn begin to conduct current again, the battery BATT is decoupled from the point EC and the regulator MPPT_REG can start maximum power point tracking for the generators G1-Gn.

For example, consider a system including 10 photovoltaic generators each supplying a current of 3 A (note that at the battery voltage, the generators G1-G10 are in their constant current operating region, and therefore supply their maximum current $I_{MAX} > I_{MPP}$). If the capacitance of the capacitors CMPPT is 5 μF, to which is added a stray capacitance of 1 μF per generator, a variation in the voltage at the point EC can reach 40 V in only 20 microseconds (μs).

During this period of 20 μs, the voltage on the power distribution busbar BUS varies very little: assuming that its nominal voltage is 28 V and its maximum current 60 A, with a busbar capacitance of 2 mF, the maximum voltage variation is 0.6 V.

A softer transition can be obtained by operating sequentially on the various sections. Initially, the additional voltage converter MPPTn+1 is deactivated, to allow the voltage at the point EC to increase freely.

Then the first converter MPPT1 is interrupted briefly, which causes a sufficient increase in the voltage at the point EC to reverse bias the diodes D'1-D'n. At this point, the first generator G1 can effect the transition to its maximum power point. The first converter MPPT1 is then reactivated and the second one deactivated, and so on.

This variant enables a considerable reduction in the capacitance of the capacitor representing the power distribution busbar BUS.

A third method briefly reduces the current fed to the load supplied with power by the distribution busbar BUS. In many missions, especially scientific missions, at the end of an eclipse a major portion of the available power is assigned to a heating element. Disconnecting this element for a few seconds has an entirely negligible thermal effect and is a very reliable way to decouple the battery. Reducing the current supplied to the load can constitute a reserve decoupling method to be used if, because of a malfunction, the battery continues to be coupled to the power distribution busbar after emerging from the eclipse.

On passing from sunlight to an eclipse, the change from the regime in which the power distribution busbar BUS is supplied with power by the photovoltaic generators to that in which it is supplied with power by the battery occurs spontaneously. With the reduced illumination, the voltage at the terminals of the generators, and therefore at the point EC, decreases until it reaches that of the battery. At this point, the diodes D'''1-D1'''n begin to conduct and the battery BATT can be discharged via the voltage converters MPPT1-MPPTn.

Note that this embodiment of the system of the invention has three important advantages over a traditional topology in which the battery BATT is charged from the power distribution busbar BUS. Firstly, the battery charging regulator BCR can take the form of a DC voltage converter of the same type as MPPT1-MPPTn and MPPTn+1, which simplifies the design of the system and increases its modularity. Secondly, the energy efficiency is increased, because the battery is charged directly by the photovoltaic generators. There is therefore only one voltage conversion step, rather than two (between the generators and the bus and between the bus and the battery). Finally, the charging regulator BCR can be of the step-down type, whereas in the prior art charging the battery requires a less efficient step of stepping up the voltage.

Alternatively, with a battery of low capacity, charging can be effected with no battery charging regulator BCR, simply by diverting into the battery the current flowing through one of the converters MPPT1-MPPTn, using a selector at the output of the converter.

Figure 6:
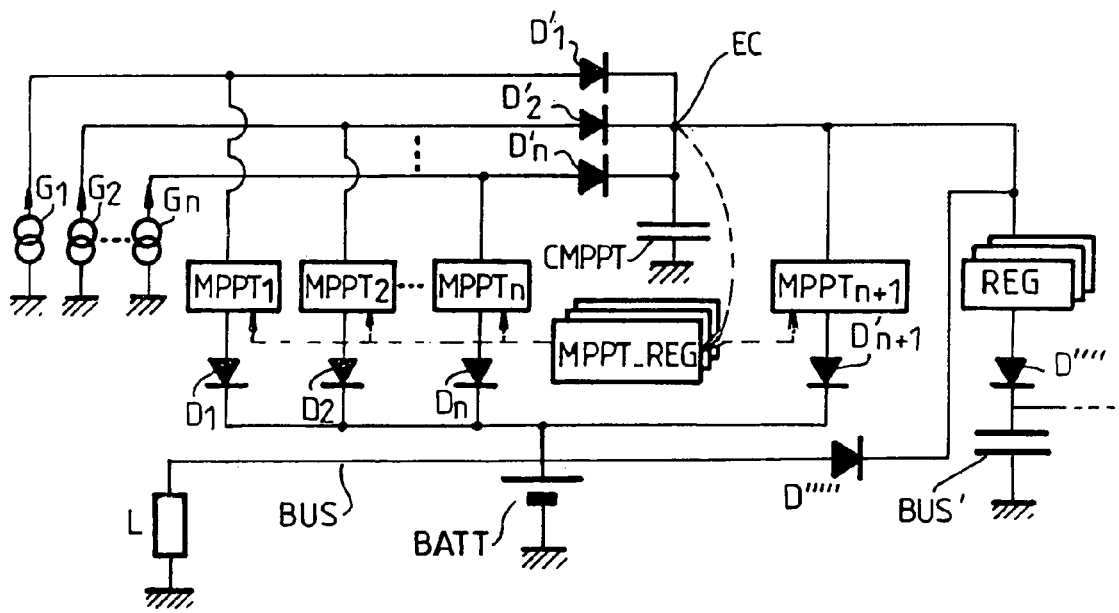
FIG. 6 is a theoretical circuit diagram of the topology of a third embodiment of an electrical energy generation system of the invention.

The third embodiment of the invention, represented in FIG. 6, is particularly suitable when most of the energy is consumed by a pulsed load, such as a radar or an electrical propulsion system.

In this embodiment, the photovoltaic generators G1-Gn are connected to charge, via associated voltage converters MPPT1-MPPTn, a battery BATT supplying power to a main power distribution busbar BUS with which the pulsed load L is associated.

FIG. 6 also includes a secondary power distribution busbar BUS', also supplying power to the other loads. This secondary power distribution busbar BUS' is in turn supplied with power by the photovoltaic generators G1-Gn via a voltage regulator REG connected to the point EC. The regulator REG features active redundancy and includes a protection diode D"" at its output.

To ensure supply of power to the secondary power distribution busbar BUS' in an eclipse, the input of said voltage regulator REG is also connected to the battery BATT of the main power distribution busbar BUS via a protection diode D"" preventing current flowing from said secondary power distribution busbar BUS' to the battery BATT.

In this embodiment also, all the voltage converters MPPT1-MPPTn, MPPTn+1 and REG can be of the same type.

In all circumstances, it is not always necessary for the generators G1-Gn to operate at their maximum power point: under conditions of high illumination or low energy consumption, non-optimum operation may suffice to supply all of the electrical power required by the common load CL. Consequently, in a manner that is known in the art, if the power necessary to supply power to the onboard equipments and where applicable to charge the battery is less than the maximum power of the generation system, the regulator MPPT_REG controls the transconductance of the converters MPPT1-MPPTn and MPPTn+1 so that the generators operate in the constant current or constant voltage portion of their characteristic curve, depending on the topology of said converters.

Although the invention has been described with reference to a photovoltaic type energy generation system intended for space applications, it must be understood that this is in no way limiting on the invention. The invention can be applied with advantage to any energy generation system, and in particular to systems including a standby battery, when it is required to maximize generation efficiency in combination with modular design and high reliability.

What is claimed is:

1. An electrical energy generation system comprising:
a plurality of direct current generators connected in parallel and connected to a common load via respective DC voltage converters having variable transconductance; and
a regulator configured to vary the transconductance of said voltage converters to maximize the power generated by said current generators;
wherein:
said generators are also connected to a common input of an additional DC voltage converter having its output connected to said common load, said additional DC voltage converter also having variable transconductance; and
said regulator is also configured to vary the transconductance of said additional voltage converter to maximize the power generated by said current generators.

2. An electrical energy generation system according to claim 1, wherein the DC current generators are connected to said common loads and to the common input of said additional DC voltage converter via respective first unidirectional devices and second unidirectional devices for isolating said generators from one another.

3. An electrical energy generation system according to claim 1, in which said common load is a capacitive load.

4. An electrical energy generation system according to claim 1, wherein said common load is either a power distribution busbar or an energy storage device.

5. An electrical energy generation system according to claim 1, wherein a capacitive element shunts the common input of said additional DC voltage converter.

6. An electrical energy generation system according to claim 1, wherein said direct current generators have substantially identical operating characteristics and said regulator imposes the same transconductance on said respective voltage converters and said additional voltage converter.

7. An electrical energy generation system according to claim 1, wherein said regulator is adapted to control the transconductances of said respective DC voltage converters and said additional DC voltage converter.

8. An electrical energy generation system according to claim 7, wherein said regulator is adapted to vary the transconductances of said respective voltage converters and said additional DC voltage converter as a function of a voltage value sampled at said common input of said additional DC voltage converter.

9. An electrical energy generation system according to claim 1, wherein said regulator is adapted to vary the transconductances of said respective voltage converters and said additional DC voltage converter to impose continuous oscillation of the operating points of said direct current generators around their maximum power point.

10. An electrical energy generation system according to claim 1, wherein said regulator is adapted to vary the transconductances of said voltage converters and said additional DC voltage converter to impose a predefined voltage at the terminals of said direct current generators determined as a function of an external condition affecting the operation of said generators.

11. An electrical energy generation system according to claim 1, wherein said voltage converters and said additional DC voltage converter are adapted to behave as open circuits in the event of a single fault.

12. An electrical energy generation system according to claim 1, wherein said direct current generators are photovoltaic generators.

13. An electrical energy generation system according to claim 1, wherein the regulator is configured to vary the transconductance of said voltage converters and said additional DC voltage converter so as:
to operate said direct current generators in a predefined region of their voltage-current characteristic in which the electrical power supplied by said generators is not the maximum power, if that electrical power is sufficient to power said common load; and
to maximize the power generated by said current generators otherwise.

14. An electrical energy generation system according to claim 1, wherein:
said common load is a power distribution busbar; and
said direct current generators are also connected to an energy storage device via a charging regulator shunting said additional voltage converter.

15. An electrical energy generation system according to claim 14, wherein said common load bus is a voltage-regulated power distribution busbar.

16. An electrical energy generation system according to claim 14, wherein said energy storage device is connected to the inputs of said voltage converters, which are adapted to operate as discharge regulators to supply power to said common load from said energy storage device.

17. An electrical energy generation system according to claim 16, wherein said energy storage device is connected to the inputs of said respective voltage converters via a third unidirectional device for preventing current from flowing from said inputs to said energy storage device.

18. An electrical energy generation system according to claim 16, wherein, under normal operating conditions, the voltage at the terminals of said energy storage device is lower than that at the terminals of said direct current generators and higher than that at the terminals of said common load.

19. An electrical energy generation system according to claim 1, wherein:
   said common load is an energy storage device connected to supply power to a main power distribution busbar;
   a secondary power distribution busbar is connected to said common input of the additional DC voltage converter via a voltage regulator; and
   the input of said voltage regulator is also connected to said energy storage device via a unidirectional device preventing current flowing from said secondary power distribution busbar to said energy storage device.

20. An electrical energy generation system according to claim 19, further including a unidirectional device disposed to prevent current flowing from said secondary power distribution busbar to said voltage regulator.

21. An electrical energy generation system according to claim 19, wherein the main power distribution busbar is connected to supply power to impulsive loads.

* * * * *

UNITED STATES PATENT AND TRADEMARK OFFICE
CERTIFICATE OF CORRECTION

PATENT NO. : 7,768,244 B2  
APPLICATION NO. : 12/000777  
DATED : August 3, 2010  
INVENTOR(S) : Perol Page 1 of 1

It is certified that error appears in the above-identified patent and that said Letters Patent is hereby corrected as shown below:

Cover Page of the Patent:

Item (73) Assignee: Agence Spatiale Europeene should read Agence Spatiale Europeenne

Signed and Sealed this
Eighth Day of March, 2011

David J. Kappos
*Director of the United States Patent and Trademark Office*